United States Patent
Song et al.

(10) Patent No.: US 12,518,201 B1
(45) Date of Patent: Jan. 6, 2026

(54) TIME-RESTRICTED MACHINE LEARNING MODELS

(71) Applicant: T-Mobile USA, Inc., Bellevue, WA (US)

(72) Inventors: Jim Song, Atlanta, GA (US); Sabitha Vikram, Alpharetta, GA (US); Ketaki Bhalerao, Bellevue, WA (US); Andreas Hindman, Bellevue, WA (US); Srikanth Reddy Annadi, Bellevue, WA (US); Winnie Chan, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1165 days.

(21) Appl. No.: 17/461,424

(22) Filed: Aug. 30, 2021

(51) Int. Cl.
*G06N 20/00* (2019.01)

(52) U.S. Cl.
CPC .................................... *G06N 20/00* (2019.01)

(58) Field of Classification Search
CPC ....................................................... G06N 20/00
See application file for complete search history.

(56) References Cited

U.S. PATENT DOCUMENTS

| | | |
|---|---|---|
| 8,473,327 B2 | 6/2013 | Anderson et al. |
| 8,712,844 B2 | 4/2014 | Koran |
| 8,768,863 B2 | 7/2014 | Gubin et al. |
| 8,924,993 B1 | 12/2014 | Niebles Duque et al. |
| 9,043,302 B1 | 5/2015 | Shimshoni et al. |
| 9,147,171 B2 | 9/2015 | Sitarski |
| 9,245,033 B2 | 1/2016 | Rao et al. |
| 9,313,533 B2 | 4/2016 | Zhang et al. |
| 9,483,462 B2 | 11/2016 | Ikawa et al. |
| 9,646,075 B2 | 5/2017 | Riggs |
| 9,679,259 B1 | 6/2017 | Frind et al. |
| 9,680,855 B2 | 6/2017 | Schultz et al. |
| 9,721,253 B2 | 8/2017 | Gideoni et al. |
| 9,785,421 B1 | 10/2017 | Neatherway |
| 9,785,890 B2 | 10/2017 | Sowani et al. |
| 9,792,020 B1 | 10/2017 | Kelley et al. |
| 10,152,363 B2 | 12/2018 | Schellenberger et al. |

(Continued)

FOREIGN PATENT DOCUMENTS

| | | |
|---|---|---|
| CN | 108897853 A | 11/2018 |
| CN | 111033632 A | 4/2020 |

(Continued)

*Primary Examiner* — David E Choi
(74) *Attorney, Agent, or Firm* — Perkins Coie LLP (57) ABSTRACT

A computer system receives a training data set that includes representations of a population of entities that are associated with a target action. Each representation in the training data set including a set of attributes of a respective entity and a time the target action associated with the respective entity occurred. The computer system segments the training data set into multiple time periods, then trains a model to identify, for each of the multiple time periods, an attribute that is correlated with a likelihood that the target action will occur with respect to an entity having the identified attribute during a corresponding time period. The computer system uses the model to perform a first operation for a first set of entities in a first time period and perform a second operation for a second set of entities in a second time period.

20 Claims, 3 Drawing Sheets

(56) References Cited

U.S. PATENT DOCUMENTS

| | | | |
|---|---|---|---|
| 10,264,096 B2 | 4/2019 | Wang et al. | |
| 10,380,654 B2 | 8/2019 | Hirtenstein et al. | |
| 10,402,723 B1 | 9/2019 | Silberman et al. | |
| 10,417,556 B1 | 9/2019 | Fairbank et al. | |
| 10,445,152 B1 | 10/2019 | Zhang et al. | |
| 10,509,791 B2 | 12/2019 | Jeon et al. | |
| 10,579,941 B2* | 3/2020 | Green | H04L 67/535 |
| 10,650,432 B1 | 5/2020 | Joseph et al. | |
| 10,657,559 B2 | 5/2020 | Sinha et al. | |
| 10,706,363 B2 | 7/2020 | Huang | |
| 10,713,311 B2 | 7/2020 | Wang | |
| 10,754,946 B1 | 8/2020 | Gribelyuk et al. | |
| 10,762,436 B2 | 9/2020 | Green et al. | |
| 10,860,961 B2 | 12/2020 | Liang | |
| 10,891,469 B2 | 1/2021 | Agarwal et al. | |
| 10,977,297 B1 | 4/2021 | Tang et al. | |
| 11,023,907 B2 | 6/2021 | Dutta et al. | |
| 11,037,236 B1 | 6/2021 | Ram et al. | |
| 11,049,022 B2 | 6/2021 | Xu et al. | |
| 11,068,942 B2 | 7/2021 | Briancon et al. | |
| 11,094,008 B2 | 8/2021 | Wolfe et al. | |
| 11,288,695 B1* | 3/2022 | Nair | G06Q 30/0224 |
| 11,397,973 B1* | 7/2022 | Vijayan | G06F 18/214 |
| 11,537,878 B2* | 12/2022 | Silberman | G06N 3/08 |
| 11,636,500 B1* | 4/2023 | Jain | G06Q 30/0203 705/7.32 |
| 11,765,789 B1* | 9/2023 | Zheng | G06F 18/214 714/25 |
| 2002/0156601 A1 | 10/2002 | Tu et al. | |
| 2012/0323760 A1 | 12/2012 | Lee et al. | |
| 2015/0287043 A1 | 10/2015 | Michaelis et al. | |
| 2015/0378807 A1 | 12/2015 | Ball et al. | |
| 2017/0236132 A1 | 8/2017 | Haxholdt et al. | |
| 2017/0308806 A1 | 10/2017 | Chao et al. | |
| 2018/0113773 A1 | 4/2018 | Krishnan et al. | |
| 2018/0240020 A1 | 8/2018 | Madaan et al. | |
| 2018/0268318 A1 | 9/2018 | Matam et al. | |
| 2018/0285780 A1 | 10/2018 | Ouyang et al. | |
| 2018/0314925 A1 | 11/2018 | Gauci et al. | |
| 2018/0330257 A1 | 11/2018 | Dodson et al. | |
| 2018/0349790 A1 | 12/2018 | Cai et al. | |
| 2019/0258818 A1 | 8/2019 | Yu et al. | |
| 2019/0325354 A1 | 10/2019 | Rajnayak et al. | |
| 2019/0370308 A1 | 12/2019 | Riggs et al. | |
| 2019/0377984 A1* | 12/2019 | Ghanta | G06F 18/2193 |
| 2019/0378165 A1* | 12/2019 | Frutschy | G06N 3/08 |
| 2020/0118038 A1 | 4/2020 | Ghoche et al. | |
| 2020/0151747 A1 | 5/2020 | Tang et al. | |
| 2020/0160064 A1 | 5/2020 | Wang et al. | |
| 2020/0184487 A1 | 6/2020 | Pandya et al. | |
| 2020/0195517 A1 | 6/2020 | Manthena | |
| 2020/0201897 A1 | 6/2020 | Palanciuc et al. | |
| 2020/0258141 A1* | 8/2020 | Habraken | G06Q 30/0641 |
| 2020/0342351 A1 | 10/2020 | Liu et al. | |
| 2020/0356878 A1 | 11/2020 | Lakshmipathy et al. | |
| 2020/0380183 A1 | 12/2020 | Collins et al. | |
| 2020/0387833 A1* | 12/2020 | Kursun | G06N 20/20 |
| 2021/0012418 A1 | 1/2021 | Feinstein et al. | |
| 2021/0035010 A1 | 2/2021 | Kramer et al. | |
| 2021/0056569 A1* | 2/2021 | Silberman | G06N 7/01 |
| 2021/0089124 A1 | 3/2021 | Manjunath et al. | |
| 2021/0133017 A1 | 5/2021 | Cheng et al. | |
| 2021/0166251 A1 | 6/2021 | Mehmanpazir et al. | |
| 2021/0173825 A1* | 6/2021 | Lu | G06F 16/2365 |
| 2021/0174257 A1 | 6/2021 | Pothula et al. | |
| 2021/0181946 A1 | 6/2021 | He et al. | |
| 2021/0201208 A1 | 7/2021 | Bhole et al. | |
| 2021/0201400 A1 | 7/2021 | Liu et al. | |
| 2021/0209641 A1* | 7/2021 | Khidekel | G06N 20/20 |
| 2021/0241141 A1 | 8/2021 | Dugger et al. | |
| 2021/0256366 A1 | 8/2021 | Zhao et al. | |
| 2021/0287129 A1* | 9/2021 | Saito | G06N 3/045 |
| 2022/0076159 A1* | 3/2022 | Owen | G06F 3/04847 |
| 2022/0092469 A1* | 3/2022 | Bremer | G06N 20/00 |
| 2022/0101341 A1* | 3/2022 | An | G06Q 30/0185 |
| 2022/0261687 A1* | 8/2022 | Nimavat | G06F 3/0482 |
| 2022/0261688 A1* | 8/2022 | Nimavat | G06N 20/00 |
| 2022/0300855 A1* | 9/2022 | Bibireata | G06N 3/08 |
| 2022/0414490 A1* | 12/2022 | Murakami | G06N 20/00 |
| 2023/0031691 A1* | 2/2023 | Carroll | G06N 3/045 |
| 2023/0060204 A1* | 3/2023 | Vijayan | G06Q 30/0282 |
| 2023/0177407 A1* | 6/2023 | Gupta | G06N 3/08 706/12 |
| 2023/0222387 A1* | 7/2023 | Lakshmipathy | G06F 16/9024 706/12 |
| 2023/0306304 A1* | 9/2023 | Lee | G06N 20/00 |
| 2024/0095549 A1* | 3/2024 | Song | G06N 20/20 |
| 2024/0161525 A1* | 5/2024 | Maiman | G06F 40/40 |
| 2024/0242018 A1* | 7/2024 | Narayanan | G06F 40/166 |
| 2024/0403720 A1* | 12/2024 | Kheiri | G06N 5/022 |
| 2025/0114044 A1* | 4/2025 | Brue | G16H 10/60 |

FOREIGN PATENT DOCUMENTS

| | | |
|---|---|---|
| CN | 111291125 A | 6/2020 |
| CN | 111400663 A | 7/2020 |
| CN | 111813585 A | 10/2020 |
| CN | 112581260 A | 3/2021 |
| EP | 0294187 B1 | 8/1996 |
| EP | 1811445 A1 | 7/2007 |
| EP | 3362959 A1 | 8/2018 |
| EP | 3663950 A1 | 6/2020 |
| EP | 3724885 A2 | 10/2020 |
| EP | 3791337 A1 | 3/2021 |
| KR | 101689908 B1 | 12/2016 |
| KR | 20200026798 A | 3/2020 |
| WO | 2006031466 A2 | 3/2006 |
| WO | 2007120360 A2 | 10/2007 |
| WO | 2019148715 A1 | 8/2019 |
| WO | 2019190626 A1 | 10/2019 |
| WO | 2020151725 A1 | 7/2020 |
| WO | 2020178811 A1 | 9/2020 |
| WO | 2020234860 A1 | 11/2020 |
| WO | 2021135105 A1 | 7/2021 |

\* cited by examiner

TIME-RESTRICTED MACHINE LEARNING MODELS

BACKGROUND

Machine learning is used in a wide variety of applications where development of conventional applications is difficult or unfeasible. Machine learning algorithms build a model based on sample data, known as training data, in order to make predictions or decisions without being explicitly programmed to do so. For example, machine learning models are trained to identify features that, if present in an entity, likely result in a certain classification of the entity. However, conventional machine learning models do not take into account time-restricted variability in the training data, where for example some features are more relevant for classifying entities at some times and other features are more relevant at other times. As a result, these machine learning models are not able to make accurate predictions or decisions with respect to such time-varying data.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Implementations herein relate to generating and applying time-restricted machine learning models to discover the priority of event-dependent features in a population of entities. A computer system trains a time-restricted entity analysis model by segmenting a training data set into multiple time periods. The training data represents a population of entities that are associated with a target action, such as entities that performed the target action, and includes a set of attributes associated with each entity as well as a time the target action occurred with respect to each entity. For each of multiple time segments of the training data set, the computer system trains a model to identify an attribute that is correlated with a likelihood that the target action will occur with respect to an entity having the identified attribute during a corresponding time period. The computer system uses the trained model to select a first attribute and a first time period, which can be used, for example, to perform an operation related to the entities having the first attribute to reduce the likelihood of the target action before or during the first time period. Implementations of the time-restricted entity analysis model described herein enable the computer system to identify different attributes that are indicative, at different times, of whether the target action is likely to occur with respect to a population of entities.

To illustrate time-restricted machine learning models, implementations are described herein with respect to an example application of identifying people who subscribe to mobile networks ("subscribers") who are likely to cancel or modify their mobile network subscriptions. However, the time-restricted machine learning models described herein can be applied to any of a variety of types of time-varying with event specific characters within the data. The models described herein can be generated and used to analyze attributes of human and non-human entities in order to predict whether the entity is likely to perform any of a variety of target actions or have any of a variety of target actions occur with respect to the entity. For example, instead of predicting which people are likely to take a specified action at which times, similar models to those described herein can be used to predict the attributes of electronic systems that are most likely to fail at certain times or the attributes of people who are most likely to contract a disease at certain times.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Figure 1:
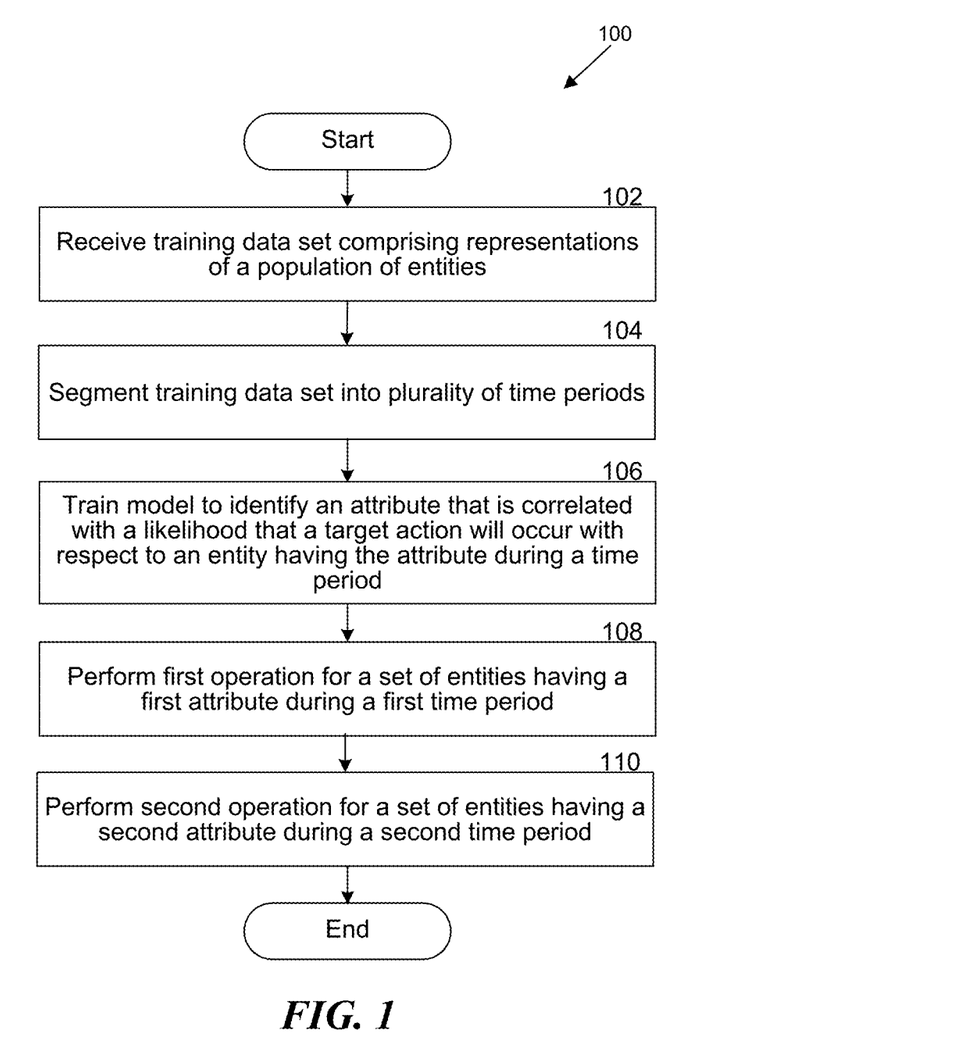
FIG. 1 is a flowchart illustrating a process for generating time-restricted machine learning models.

FIG. 1 is a flowchart illustrating a process 100 for generating time-restricted machine learning models. The process 100 is performed by a computer system executing computer program instructions stored in a computer-readable medium, such as a memory.

As shown in FIG. 1, the computer system receives, at block 102, a training data set including representations of a population of entities that are associated with a target action. For each entity in the population, the training data set includes a set of attributes of the entity and a time indicating when the target action occurred with respect to the entity. In various implementations, the training data set can include entities that performed the target action or for which the target action occurred, entities that did not perform the target action or for which the target action did not occur, or both.

By way of example, the population of entities can be a set of users (or "subscribers") that subscribe to a service offered by a business and the target action is an action taken by at least some of the users to change their subscriptions. For example, if the business is a mobile network operator, the target action includes actions taken by users to cancel their mobile network plans, subscribe to new mobile network plans, or modify mobile network plans by adding or removing features from an existing plan. The attributes of each of these users can include any of a variety of types of information, such as demographic information, financial information (which includes payment), device information, history of use of mobile services, relationship status information, or information about the customer's past or current mobile network plan. For example, the set of attributes of a user represented in the training data set includes the user's age, gender, status as single/dating/married, location, parental status, a frequency of the user's domestic or international travel, mobile plan activation date, type of device used, the number of users, the interactions with the carrier, amount owed for mobile plan subscription charges, payment history, number of devices subscribed to plan, identity of device(s) subscribed to plan, purchase history, and/or age of device(s) subscribed to plan. As used herein, an "attribute" can correspond to a feature as used by a machine learning model (e.g., an individual measurable property of an entities that is used by the machine learning model to classify the entity). Attributes can additionally or alternatively represent combinations of the features used by the machine learning models described herein.

The set of training data received at block 102 can include representations of any of a variety of other types of entities or can pertain to any of a variety of other types of target actions. Furthermore, in addition to or instead of actions that are actively performed by the entities, the target actions can include passive events that happen to an entity. Example passive events include a person contracting a complex disease or condition or an electronic device experiencing a critical failure.

At block 104, the computer system segments the training data set into a plurality of time periods using the time indicated by each representation in the training data set. In some implementations, the computer system segments the training data set by applying a rolling time window. For example, a first time period spans a specified number of days before and after a first day, while a second time period spans a specified number of days before and after a second day while overlapping with the first time period. When segmenting the training data into these time periods, the computer system identifies any data point in the training data set that corresponds to an occurrence of the target action on a day that falls within each time period. For example, the training dataset can include data from multiple years, and a segment of the training data includes any data point from any of the years that falls within a specified time window around Black Friday.

The computer system can segment the training data set into time periods that have equal or different lengths. Furthermore, the computer system can segment the training data set into time periods with different lengths that account for different time scales of the target action. For example, when the target action relates to changes to customers' mobile plan subscriptions, the relevant time can be a day of the year, and the computer system segments the data according to the day of the year on which the target action occurred (regardless of the year from which the item of training data was captured). For other applications of the processes described herein, the frequency of a target action may vary over the course of a single day such that minute- or hour-based time periods capture more relevant variations in the training data set than day-based time periods. Other types of data may vary over longer time scales (e.g., over multiple years or a decade), and the computer system selects relevant time periods to accommodate the longer time scale of the data.

In addition to segmenting the training data into a plurality of time periods, the computer system can receive and segment additional historical data into other datasets for training, testing, or validating machine learning models. For example, the computer system receives and segments a validation dataset and a testing dataset for each time period into which the training dataset is segmented.

Figure 2:
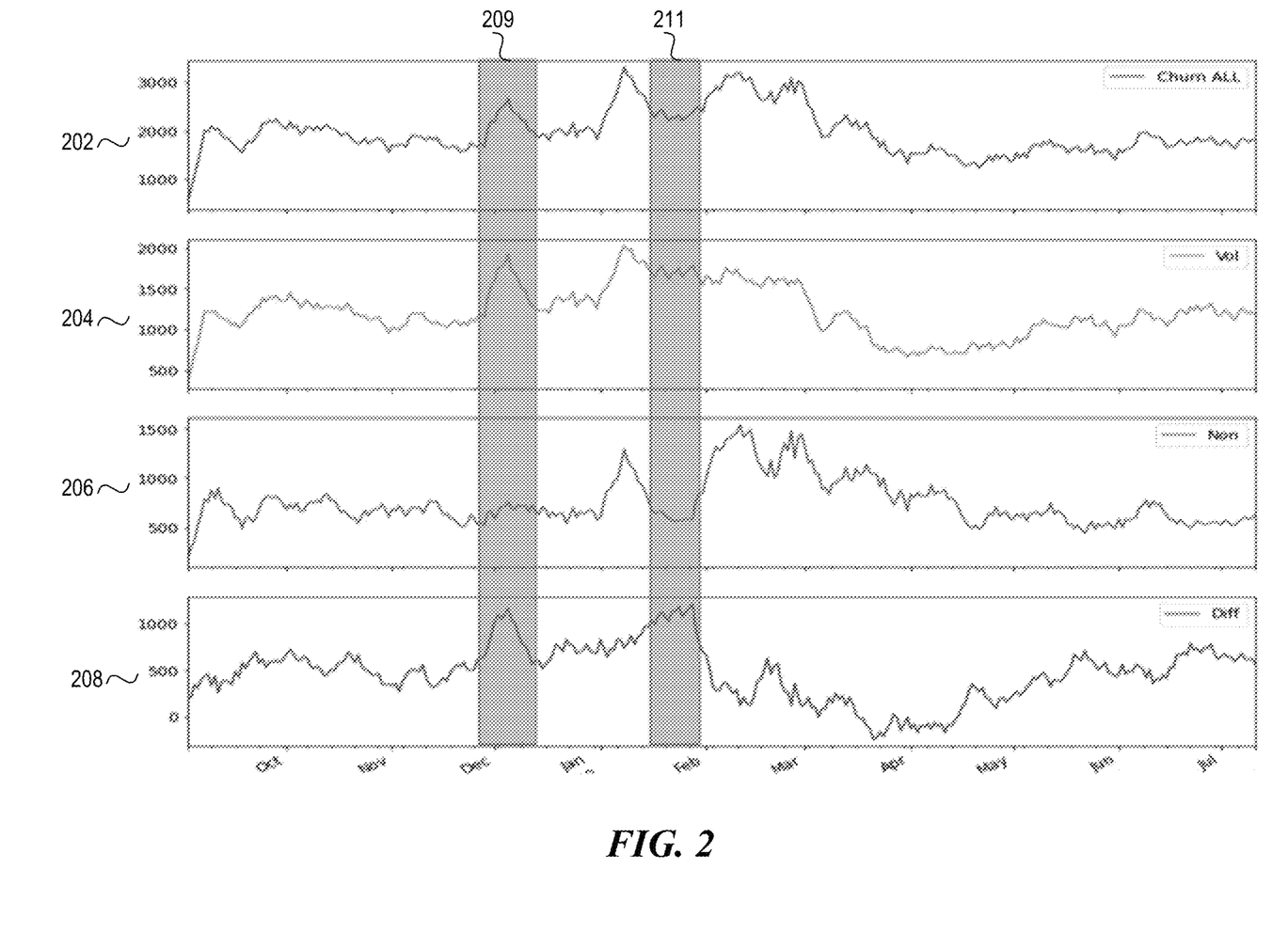
FIG. 2 is a graph illustrating example target action data.

FIG. 2 illustrates example target action data analyzed by the computer system during the process 100. The graphs in FIG. 2 illustrate numbers of mobile network subscribers who canceled their mobile network plans with a given provider, plotted against the day of the year on which the plans were canceled. Graph 202 illustrates a total number of canceled plans. Graph 204 illustrates those who voluntarily left their plans (e.g., because they chose to select another mobile network provider), while graph 206 illustrates non-voluntary churn (e.g., resulting from payment delinquency). The final graph 208 illustrates the difference between the number of subscribers in the sample data set who voluntarily left their plans and those who involuntarily left their plans. Time windows 209 and 211, as illustrated in the example data set, contain visually distinctive numbers of voluntary versus involuntary plan cancellations. To identify the attributes of the subscribers who have chosen to cancel their mobile network plans during these two time periods, the computer system can apply the process 100 to the subscribers represented in graph 208 during each of the two time windows 209, 211.

Returning to FIG. 1, at block 106, the computer system trains a time-restricted entity analysis model using the segmented training data sets. In general, the time-restricted entity analysis model identifies attributes that are correlated with a likelihood that a target action will occur with respect to entities having the identified attribute, during each of the segmented time periods. For each time period, the time-restricted entity analysis model can output a ranking of attributes according to the likelihood that the target action will occur with respect to entities having each of the ranked attributes, during the corresponding time period. One or more attributes can be selected based on the rankings. For example, the model is trained to identify a highest-ranked attribute in a first time period, where people having the highest-ranked attribute are more likely to perform the target action during the first time period than people without the attribute. Alternatively, the model is trained to identify a first attribute for which people having the first attribute are more likely to perform the target action during the first time period than during other time periods.

The time-restricted entity analysis model is a machine learning model, which as used herein refers to a construct that is trained using training data to make predictions or provide probabilities for new data items, whether or not the new data items were included in the training data. For example, a model can be a probability distribution resulting from the analysis of training data, such as a likelihood of a target action occurring with respect to a given entity. In some implementations, the time-restricted entity analysis model generated by the computer system includes one or more random forest models that are trained using historical data to identify attributes of entities that are correlated with a likelihood that a target action will occur with respect to entities having such attributes. However, the computer system can train any of a variety of other types of models, such as neural networks, support vector machines, Parzen windows, Bayes clustering, reinforcement learning, probability distributions, and others. Models can be configured for various situations, data types, sources, and output formats.

In some implementations, the time-restricted entity analysis model includes at least one random forest model that takes a set of attributes of an entity as an input and applies the set of attributes to multiple decision trees that predict, based on the attributes, whether the target action will occur with respect to the entity. Each decision tree within the random forest model includes a hierarchy of nodes. Data at each node is split into two or more lower-level nodes according to a splitting criterion, until the data reaches a leaf node where no further branching is possible. The splitting criterion at each node can define, for example, a criterion that causes data to be grouped at each lower-level node such that similarity (e.g., with respect to whether the target action occurred) is optimized within a group of data, while dissimilarity is optimized between the groups of data. The leaf nodes in each decision tree can represent a predicted classification of the entity based on the attributes input to the tree. In the random forest model, the attributes of an entity can be applied to each of multiple trees and each tree can predict the classification of the entity based on its attributes. The computer system identifies the classification that is predicted by the majority of the trees, which is then output as the final model prediction of the random forest model.

The time-restricted entity analysis model can be trained with supervised learning, where the training data includes inputs (e.g., a set of attributes of an entity) and desired outputs (e.g., a classification indicating whether the target action occurred with respect to the entity). A representation of an entity's set of attributes and an indication of whether the target action occurred with respect to the entity can be provided to the model. Outputs from the model, such as a prediction as to whether a target action will occur with respect to an entity having a given attribute will occur within a given time period, can be compared to the desired output. Based on the comparison, the model can be modified, such as by modifying the split criteria applied at each branch of each decision tree in the random forest. After applying each of the data points in each segment of the training data and modifying the model in this manner, the model can be trained to evaluate new data points (such as a set of attributes associated with a new entity) to predict whether the target action will occur with respect to the new data points.

To train the time-restricted entity analysis model using the segmented training data sets at block 106, the computer system can train multiple different time-segmented machine learning models corresponding to the multiple segments of the training data set. For example, a first set of the segmented training data includes training data with timestamps falling between time t1 and time t2. The computer system uses the first training data set to train a first random forest model, which is configured to use attributes of a first set of entities to predict whether the target action will occur with respect to entities in the first set during the time period between t1 and t2. A second set of the segmented training data includes training data with timestamps falling between time t3 and time t4. Like the first training data set, the computer system uses the second training data set to train a second random forest model that, when trained, is configured to use attributes of a second set of entities to predict whether the target action will occur with respect to the entities in the second set during the time period between t3 and t4. Thus, implementations of the time-restricted entity analysis model described herein can represent multiple time-segmented models that are each trained using a different one of multiple segmented sets of training data.

In some implementations, the computer system segments the training data and trains corresponding models in multiple iterations, where each iteration segments the data into different-length time periods. For example, in a first iteration, the computer system segments the training data into time segments that are all approximately a first duration, then trains a model using the data of each time segment. In a second iteration, the computer system segments the training data into time segments that are all approximately a second duration (different from the first duration). The computer system then trains new models using the segmented data from the second iteration. The number of iterations of segmentation and training performed by the computer system can depend on the total time window analyzed.

At block 108, the computer system uses the model to select a first attribute and a first time period and perform a first operation, during the first time period, for a set of entities having the first attribute. The first attribute and the first time period can be selected based on any of a variety of comparisons between likelihoods that the target action will occur with respect to entities in the population, as indicated by the trained model. In some embodiments, the computer system selects the first attribute if the model indicates that the target action is more likely with respect to entities having the first attribute than with respect to entities that do not have the first attribute. For example, the computer system identifies one or more highest-ranked attributes in the ranking output by the model for the first time period, or one or more attributes that are associated with a highest likelihood of the target action during the first time period. In another example, the computer system compares an average likelihood of the target action occurring during the first time period to the likelihood of the target action occurring during the first time period for entities having a given attribute. Any attribute for which the likelihood of the target action is greater than the average likelihood can then be selected as a first attribute. For example, if an attribute is ranked fifth or sixth in most time periods but ranked third or fourth in the first time period, the computer system can select the attribute as the first attribute.

In other embodiments, the computer system selects the first attribute at block 108 if the trained model indicates that the target action is more likely during the first time period than during a second time period, with respect to entities having the first attribute. This can include identifying one or more attributes for which entities having the attributes are most likely to perform the target action during the first time period, out of the set of all time periods. For example, if it is determined that a mobile network subscriber who is subscribed to a family plan is more likely to switch mobile network plans between Thanksgiving and Christmas than at any other time of year, the attribute of being a current family plan subscriber can be selected as the first attribute.

When selecting the first attribute and first time period, the computer system can vary the time periods of the segments of training data in order to explore how the population of entities varies over time with respect to the likelihood of the target action. In some implementations, the computer system uses any of a variety of hyperparameter optimization techniques, such as a grid search, to identify the length of a time period that is relevant to one or more particular attributes. For example, the computer system generates a first training data set for a first time period with length L1, centered at day D1. A second training data set is generated for a second time period with length L2 centered at day D1, and a third training data set is generated for a third time period with length L3 centered at day D1. The computer system trains a model using the training data segmented into each of the first, second, and third time periods, and compares the one or more evaluation criteria associated with each model to select either the first length L1, the second length L2, or the third length L3 as the length of the time period to use for the time period centered at day D1. Any of a variety of scoring mechanisms can be used to select the length of the time period, such as a receiver operating characteristic (ROC) curve and area under the ROC curve (AUC), precision score, recall score, or F1 score. A similar technique can be applied to generate time periods with different lengths across the set of times applicable to the training data set, such as a first time period with a first length at a first time of year and a second time period with a second length at a second time of year. The parameters of the grid search performed by the computer system can be a time window length (which can vary, for example, from approximately seven to approximately 90 days), as well as the top-ranked attributes output by the model for each time period.

Finally, at block 110, the computer system uses the model to select a second attribute and a second time period, then performs a second operation, during the second time period, for a set of entities having the second attribute. The second attribute and second time period can be selected in a manner similar to the selection of the first attribute and first time period at block 108. For example, the computer system selects the second attribute if the model indicates that the target action is more likely during the second time period with respect to entities having the second attribute than with respect to entities that do not have the second attribute.

When selecting the first and second attributes at blocks 108 and 110, the computer system can apply other types of models in addition to the time-restricted entity analysis model. For example, the computer system can train one or more models that predict the day of the week or the hour of the day during which the target action is more likely to occur, independently of the time of year or the variation in attributes that are correlated with the target action at different times of year. These day-of-week or hour-of-day models can be combined with a time-restricted entity analysis model examining longer time periods (such as a month) to more accurately predict whether the target action will occur at a specific time. In an example where the target action is a customer placing a call to a mobile network provider to cancel the customer's subscription, the time-restricted entity analysis model is used to identify particular attributes of customers who are likely to cancel their subscriptions in a given month. The day-of-week and time-of-day models can be used in conjunction with this time-restricted model to predict, for example, that a customer with the particular attributes who is calling at 4 pm on Saturday is highly likely to cancel his subscription, but that another customer with the particular attributes who is calling at 10 am on Sunday is highly unlikely to cancel her subscription.

The first and second operations performed by the computer system in the process 100 can be operations related to changing the likelihood of the target action for the first and second sets of entities. For example, when the target action is an action performed by people, the first and/or second operations can include generating targeted promotions or messages to induce people to perform or not perform the target action. When the target action is a passive event that occurs to people, animals, or objects, the first and/or second operations can include, for example, issuing warnings to people who can control or monitor the entities associated with the target action, scheduling preventative checkups or maintenance, or automatically decommissioning systems that are most likely to fail.

As one example of the process 100, where the target action represents mobile network subscribers canceling or not renewing their mobile subscription plans, the trained model can be used to identify attributes of subscribers who are likely to perform the target action at different times of year and thus inform marketing or promotional campaigns of the mobile network provider. For example, the types of subscribers who leave their plans (e.g., to switch to a different provider) around Black Friday may be different than the types of subscribers who leave their plans leading up to Valentine's Day. Those who cancel their subscriptions around Black Friday may, for example, be those who are moving to a new mobile network provider to service new mobile phones purchased as gifts for each member of a family, while those who cancel their subscriptions in the lead up to Valentine's Day may be those who have new devices purchased for them by a romantic partner and thus no longer need their old subscriptions. Furthermore, the duration over which subscribers with a given attribute leave their plans may be different for different times of year. For example, subscribers who are motivated to leave their plans around Black Friday may experience this motivation for a longer period of time (e.g., from one week before Black Friday until Christmas) than those who are motivated to leave around Valentine's Day (where, for example, cancellation of plans is primarily observed in the week following Valentine's Day). Since these subscribers have different attributes, different incentives may encourage some types of subscribers to retain their subscriptions while having no effect on other types of subscribers, and the timing of the incentives may have different effectiveness depending on the type of subscriber or time of year. In this example, the mobile network provider may determine that incentives for family plans are more effective around Black Friday than around Valentine's Day, and that incentives for adding a new device to an existing plan are more effective around Valentine's Day than Black Friday. Thus, by knowing the attributes of the subscribers who are more likely to cancel or not renew their subscriptions at different times of year, the mobile network provider can offer incentives that are tailored to the specific attributes of the subscribers who are likely to cancel and to provide those incentives at the most relevant time for the subscribers' likely cancellations. The time-restricted models described herein enable the computer system to more accurately determine the attributes of the cancelling subscribers than conventional models.

Computer System

Figure 3:
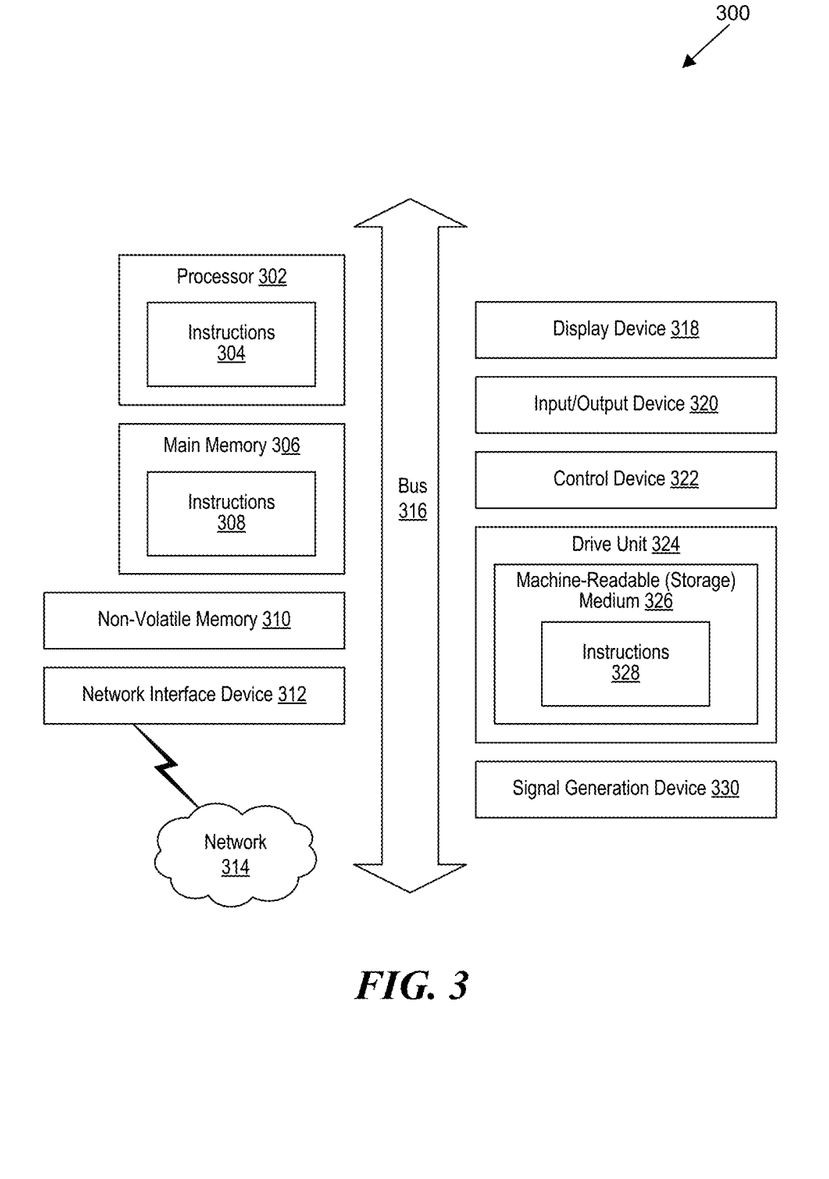
FIG. 3 is a block diagram that illustrates an example of a computer system in which at least some operations described herein can be implemented.

FIG. 3 is a block diagram that illustrates an example of a computer system 300 in which at least some operations described herein can be implemented. As shown, the computer system 300 can include: one or more processors 302, main memory 306, non-volatile memory 310, a network interface device 312, video display device 318, an input/output device 320, a control device 322 (e.g., keyboard and pointing device), a drive unit 324 that includes a storage medium 326, and a signal generation device 330 that are communicatively connected to a bus 316. The bus 316 represents one or more physical buses and/or point-to-point connections that are connected by appropriate bridges, adapters, or controllers. Various common components (e.g., cache memory) are omitted from FIG. 3 for brevity. Instead, the computer system 300 is intended to illustrate a hardware device on which components illustrated or described relative to the examples of the figures and any other components described in this specification can be implemented.

The computer system 300 can take any suitable physical form. For example, the computing system 300 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 300. In some implementation, the computer system 300 can be an embedded computer system, a system-on-chip (SOC), a single-board computer system (SBC) or a distributed system such as a mesh of computer systems or include one or more cloud components in one or more networks. Where appropriate, one or more computer systems 300 can perform operations in real-time, near real-time, or in batch mode.

The network interface device 312 enables the computing system 300 to mediate data in a network 314 with an entity that is external to the computing system 300 through any communication protocol supported by the computing system 300 and the external entity. Examples of the network interface device 312 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 306, non-volatile memory 310, machine-readable medium 326) can be local, remote, or distributed. Although shown as a single medium, the machine-readable medium 326 can include multiple media (e.g., a centralized/distributed database and/or associated caches and servers) that store one or more sets of instructions 328. The machine-readable (storage) medium 326 can include any medium that is capable of storing, encoding, or carrying a set of instructions for execution by the computing system 300. The machine-readable medium 326 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 310, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 304, 308, 328) set at various times in various memory and storage devices in computing device(s). When read and executed by the processor 302, the instruction(s) cause the computing system 300 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one computer-readable storage medium, excluding transitory signals and carrying instructions, which, when executed by at least one data processor of a system, cause the system to:
   receive a training data set comprising representations of a population of users that are associated with a target action, each representation in the training data set including a set of attributes of a respective user and a time the target action associated with the respective user occurred;
   segment the training data set into multiple time periods using the time indicated by each representation in the training data set;
   train, using the segmented training data set, a model that causes the system to identify, for each of the multiple time periods, one or more attributes that are correlated with a likelihood that the target action will occur with respect to a user having the identified one or more attributes during a corresponding time period;
   perform a first operation for a first set of users during a first time period, the first set of users having a first attribute, wherein the first set of users and the first time period are selected using the model based on a comparison between the likelihood during the first time period that the target action will occur with respect to the first set of users and the likelihood during the first time period that the target action will occur with respect to a second set of users that do not have the first attribute; and
   perform a second operation for the second set of users during a second time period, the second set of users having a second attribute, wherein the second set of users and the second time period are selected using the model based on a comparison between the likelihood during the second time period that the target action will occur with respect to the second set of users and the likelihood during the second time period that the target action will occur with respect to the first set of users.

2. The computer readable storage medium of claim 1, wherein segmenting the training data set into the plurality of time periods comprises applying a rolling time window that selects a first subset of the representations that are associated with times falling within a first time period and selects a second subset of the representations that are associated with times falling within a second time period, wherein the first and second time periods overlap.

3. The computer readable storage medium of claim 1, wherein segmenting the training data set into the plurality of time periods comprises splitting the training data set into the first time period and a second time period that has a different length than the first time period.

4. The computer readable storage medium of claim 1, wherein the model is configured to output a ranking of multiple attributes of the population of users for each of the multiple time periods, and wherein the instructions when executed further cause the system to:
   select, as the first attribute, a highest-ranked attribute during the first time period.

5. The computer readable storage medium of claim 1, wherein selecting the first attribute and the first time period comprises:
   identifying one or more attributes for which the likelihood of the target action occurring during the first time period for users having the identified one or more attributes is greater than an average likelihood of the target action during the first time period; and
   selecting one of the identified one or more attributes as the first attribute.

6. The computer readable storage medium of claim 1, wherein the population of users include subscribers to a mobile network service, and wherein the target action includes a subscriber canceling a subscription to the mobile network service, adding the subscription to the mobile network service, or modifying the subscription to the mobile network service.

7. The computer readable storage medium of claim 6, wherein the computer program instructions when executed further cause the processor to:
   select an incentive to send to subscribers having the first attribute during the first time period.

8. The computer readable storage medium of claim 7, wherein the first time period is a first portion of a year.

9. A method comprising:
   receiving, at a computer system, a training data set comprising representations of a population of entities that are associated with a target action, each representation in the training data set including a set of attributes of a respective entity and a time the target action associated with the respective entity occurred;
   segmenting, by the computer system, the training data set into a plurality of time periods using the time indicated by each representation in the training data set;
   training, by the computer system, using the segmented training data set, a model that causes the computer system to identify, for each of the plurality of time periods, one or more attributes that is correlated with a likelihood that the target action will occur with respect to an entity having the identified one or more attributes during a corresponding time period;
   perform a first operation for a first set of entities during a first time period, the first set of entities having a first attribute, wherein the first set of entities and the first time period are selected using the model based on a comparison between the likelihood during the first time period that the target action will occur with respect to the first set of entities and the likelihood during a second time period that the target action will occur with respect to the first set of entities; and perform a second operation for the second set of entities during the second time period, the second set of entities having a second attribute, wherein the second set of entities and the second time period are selected using the model based on a comparison between the likelihood during the second time period that the target action will occur with respect to the second set of entities and the likelihood during a third time period that the target action will occur with respect to the second set of entities.

10. The method of claim 9, wherein segmenting the training data set into the plurality of time periods comprises applying a rolling time window that selects a first subset of the representations that are associated with times falling within a first time period and selects a second subset of the representations that are associated with times falling within a second time period, wherein the first and second time periods overlap.

11. The method of claim 9, wherein segmenting the training data set into the plurality of time periods comprises splitting the training data set into the first time period and a second time period that has a different length than the first time period.

12. The method of claim 9, wherein the model is configured to output a ranking of multiple attributes of the population of users for each of the multiple time periods, and wherein the method further comprises:
select, as the first attribute, a highest-ranked attribute during the first time period.

13. The method of claim 9, wherein selecting the first attribute and the first time period comprises:
identifying one or more attributes for which the likelihood of the target action occurring during the first time period for entities having the identified one or more attributes is greater than an average likelihood of the target action during the first time period; and
selecting one of the identified one or more attributes as the first attribute.

14. A system, comprising:
at least one hardware processor; and
at least one non-transitory memory storing instructions, which, when executed by the at least one hardware processor, cause the system to:
receive a training data set comprising representations of a population of entities that are associated with a target action, each representation in the training data set including a set of attributes of a respective entity and a time the target action associated with the respective entity occurred;
segment the training data set into multiple time periods using the time indicated by each representation in the training data set;
train, using the segmented training data set, a model that causes the system to identify, for each of the multiple time periods, an attribute that is correlated with a likelihood that the target action will occur with respect to an entity having the identified attribute during a corresponding time period;
perform a first operation for a first set of entities during a first time period, the first set of entities having a first attribute, wherein the first set of entities and the first time period are selected using the model based on a comparison between the likelihood during the first time period that the target action will occur with respect to the first set of entities and the likelihood during the first time period that the target action will occur with respect to a second set of entities that do not have the first attribute; and
perform a second operation for the second set of entities during a second time period, the second set of entities having a second attribute, wherein the second set of entities and the second time period are selected using the model based on a comparison between the likelihood during the second time period that the target action will occur with respect to the second set of entities and the likelihood during the second time period that the target action will occur with respect to the first set of entities.

15. The system of claim 14, wherein segmenting the training data set into the plurality of time periods comprises applying a rolling time window that selects a first subset of the representations that are associated with times falling within a first time period and selects a second subset of the representations that are associated with times falling within a second time period, wherein the first and second time periods overlap.

16. The system of claim 14, wherein segmenting the training data set into the plurality of time periods comprises splitting the training data set into the first time period and a second time period that has a different length than the first time period.

17. The system of claim 14, wherein the model is configured to output a ranking of multiple attributes of the population of users for each of the multiple time periods, and wherein the instructions when executed further cause the system to:
select, as the first attribute, a highest-ranked attribute during the first time period.

18. The system of claim 14, wherein selecting the first attribute and the first time period comprises:
identifying one or more attributes for which the likelihood of the target action occurring during the first time period for entities having the identified one or more attributes is greater than an average likelihood of the target action during the first time period; and
selecting one of the identified one or more attributes as the first attribute.

19. The system of claim 14, wherein the population of entities include subscribers to a mobile network service, and wherein the target action includes a subscriber canceling a subscription to the mobile network service, adding the subscription to the mobile network service, or modifying the subscription to the mobile network service.

20. The system of claim 19, wherein the processor is further caused to:
select an incentive to send to subscribers having the first attribute during the first time period.

* * * * *